United States Patent
Ramaswamy et al.

(10) Patent No.: US 9,575,484 B2
(45) Date of Patent: Feb. 21, 2017

(54) SYSTEM AND METHOD FOR IDENTIFICATION OF CONTACT BETWEEN A HUMAN AND A STATIC IMPLEMENT IN A POWER TOOL

(71) Applicants: Robert Bosch Tool Corporation, Broadview, IL (US); Robert Bosch GmbH, Stuttgart (DE)

(72) Inventors: Bharadwaja Maharshi Ramaswamy, Bangalore (IN); Niranjan Sathyanarayanarao Krishnarao, Bangalore (IN); Sai Yogesh Kumar Mangapuram, Bangalore (IN); Vishwanatha Manevarthe Srikantiah, Bangalore (IN)

(73) Assignees: Robert Bosch Tool Corporation, Broadville, IL (US); Robert Bosch GmbH, Stuttgart (DE)

( * ) Notice: Subject to any disclaimer, the term of this patent is extended or adjusted under 35 U.S.C. 154(b) by 1007 days.

(21) Appl. No.: 13/827,763

(22) Filed: Mar. 14, 2013

(65) Prior Publication Data
US 2014/0094956 A1    Apr. 3, 2014

(30) Foreign Application Priority Data
Sep. 28, 2012 (IN) ............... 4064/CHE/2012

(51) Int. Cl.
  *G05B 19/406* (2006.01)
  *B23Q 11/00* (2006.01)
(52) U.S. Cl.
  CPC ......... *G05B 19/406* (2013.01); *B23Q 11/0082* (2013.01)

(58) Field of Classification Search
CPC . G05B 19/046; G05B 19/406; B23Q 11/0082; B23Q 13/00; B26D 7/27
See application file for complete search history.

(56) References Cited

U.S. PATENT DOCUMENTS 6,446,231 B1   9/2002  Inoshita et al.
7,536,238 B2   5/2009  Gass
(Continued)

FOREIGN PATENT DOCUMENTS

EP   2328142 A1    6/2011
JP   2006006463 A  1/2006

OTHER PUBLICATIONS

International Search Report and Written Opinion corresponding to PCT Application No. PCT/IN2013/000591, mailed Mar. 7, 2014 (13 pages).

*Primary Examiner* — Toan Le
(74) *Attorney, Agent, or Firm* — Maginot Moore & Beck LLLP

(57) ABSTRACT

A method of operating a power tool detects human contact with a non-moving implement in the power tool. The method includes generating a series of samples of an electrical signal passing through the non-moving implement, identifying a component for each sample in the series of samples of the electrical signal, identifying a first max–min value corresponding to a first plurality of samples in the series of samples occurring during a first periodic time interval with reference to a difference between a maximum value and a minimum value identified in the components of the first plurality of samples, and identifying human contact with the non-moving implement in response to the first max–min value being greater than a first predetermined threshold.

15 Claims, 5 Drawing Sheets

(56) References Cited

U.S. PATENT DOCUMENTS

| | | |
|---|---|---|
| 7,739,934 B2 | 6/2010 | Tetelbaum et al. |
| 7,888,826 B1 | 2/2011 | Shafer et al. |
| 2006/0140314 A1 | 6/2006 | Kim et al. |
| 2008/0078470 A1* | 4/2008 | O'Branion ............. B23D 47/08 144/356 |
| 2010/0206145 A1 | 8/2010 | Tetelbaum et al. |

* cited by examiner

SYSTEM AND METHOD FOR IDENTIFICATION OF CONTACT BETWEEN A HUMAN AND A STATIC IMPLEMENT IN A POWER TOOL

CLAIM OF PRIORITY

This application claims priority to a pending Indian application with serial number 4064/CHE/2012, which is entitled "SYSTEM AND METHOD FOR IDENTIFICATION OF CONTACT BETWEEN A HUMAN AND A STATIC IMPLEMENT IN A POWER TOOL," and was filed on Sep. 28, 2012.

TECHNICAL FIELD

This disclosure relates generally to power tools, and, more specifically, to systems and methods for detecting contact between a human and a non-moving implement in a power tool.

BACKGROUND

Detection or sensing systems have been developed for use with various kinds of manufacturing equipment and power tools. Such detection systems are operable to trigger a reaction device by detecting or sensing the proximity or contact of some appendage of an operator with some part of the equipment. For example, existing capacitive contact sensing systems in table saws detect contact between the operator and a moving blade.

FIG. 1 depicts a prior art capacitive sensing based detection system 90 that is incorporated with a table saw 1. The detection system 90 drives an excitation voltage that is electrically coupled to a movable blade 22 of the saw 1, and detects the current drawn from the blade 22. The amplitude or phase of the detected current and/or excitation voltage changes when the blade 22 comes into contact with an electrically conductive object (such as an operator's hand, finger or other body part, as well as work pieces). The characteristics of the changes are used to trigger the operation of a reaction system 92. The reaction system 92 disables operation of the blade 22 by, for example, applying a brake to cease motion of the blade 22 and/or by dropping or otherwise removing the blade 22 from the cutting area. One example of a reaction system 92 uses an explosive charge to drive a stopper (not shown) into the blade 22 to arrest the motion of the blade 22. In addition, or instead, an embodiment of the reaction system 92 drops or collapses a blade support member (not show) to urge the blade 22 below the surface of the table 14.

The embodiment of the detection system 90 shown in FIG. 1 includes an oscillator 10 that generates a time-varying signal on line 12. The time-varying signal is any suitable signal type including, for example, a sine wave, a sum of multiple sine waves, a chirp waveform, a noise signal, etc. The frequency of the signal is chosen to enable a detection system to distinguish between contact with the first object, such as a finger or hand, and a second object, such as wood or other material, to be cut by the power tool. In the embodiment of FIG. 1, the frequency is 1.22 MHz, but other frequencies can also be used, as well as non-sinusoidal wave shapes. The oscillator 10 is referenced to the saw table 14 or other metallic structure as a local ground. As shown in FIG. 1, the blade 22 is disposed vertically in an opening defined by the saw table 14 (or work surface or cutting surface or platform).

The oscillator 10 is connected to two voltage amplifiers or buffers 16, 18 through the line 12. The first voltage amplifier 16 has an output connected to line 20, which operatively couples the output of the oscillator to the saw blade 22. A current sensor 24 operatively couples a signal from line 20 onto line 26 that is fed to an amplifier 28, which is connected to a processor 30 by line 32. The current sensor 24 is, for example, a current sense transformer, a current sense resistor, a Hall Effect current sense device, or other suitable type of current sensor. An output line 34 from the processor 30 is operatively connected to the reaction system 92 so that the processor 30 triggers the reaction system 92 if predetermined conditions are detected indicating, for example, contact between the blade 22 and the first object.

The signal on line 26 is indicative of the instantaneous current drawn by the blade 22. Because the saw blade 22 is in motion during operation of the table saw, the connection is made through an excitation plate 36, which is mounted generally parallel to the blade 22. The plate 36 is driven by the first voltage amplifier 16, and is configured with a capacitance of approximately 100 picoFarad (pF) relative to the blade 22 in the embodiment of FIG. 1. The plate 36 is held in a stable position relative to the side of the blade 22. The excitation plate 36 is configured to follow the blade 22 as the height and bevel angle of the blade 22 are adjusted during operation of the saw 1.

The capacitance between the first object and the saw table 14 (or power line ground if one is present) is in the range of approximately 30-50 pF in the embodiment of FIG. 1. When the capacitance between the excitation plate 36 and the saw blade 22 exceeds the capacitance between the first object and the saw table 14, the detection thresholds are not unduly affected by changes in the plate-to-blade capacitance. In the configuration of FIG. 1, the plate 36 is arranged in parallel with the blade 22 on the side where the blade 22 rests against the arbor 37, so that changes in blade thickness do not affect the clearance between the blade 22 and the plate 36. Other methods of excitation, including contact through the arbor bearings or brush contact with the shaft or the blade, could be used to the same effect.

In the detection system 90, the second-amplifier 18 is connected to a shield 38, and the amplifier 18 drives the shield 38 to the same potential as the excitation plate 36. Also, sensors in the detection system 90 optionally monitor the level of electrical current drawn by the shield 38. The shield 38 extends around the blade 22 underneath the table 14, and is spaced some distance away from the blade 22 on the top of the table 14 in the configuration of FIG. 1. The configuration of the shield 38 reduces the static capacitance between the blade 22 and the table 14, which acts as a ground plane if the table is not electrically connected to an earth ground. In various embodiments, the shield 38 is a continuous pocket of mesh, or some other type of guard that is electrically equivalent to a Faraday cage at the excitation frequencies generated by the oscillator 10. The shield 38 optionally includes a component that moves with the blade adjustments, or is large enough to accommodate the blade's adjustment as well as the various blades that can be fitted on the table saw. In the configuration of FIG. 1, the shield 38 moves with the blade adjustments, and includes a throat plate area of the table top 14.

The processor 30 performs various pre-processing steps and implements an adaptive trigger that enables detection of conditions indicative of contact between the first object and the blade 22. The processor 30 optionally includes one or more associated analog-to-digital (A/D) converters. The blade current signal from the current sensor 24 is directed to one or more of the A/D converters, which generate a corresponding digital signal. A blade voltage signal representing the voltage drop between the blade 22 and the excitation plate 36 is directed to an A/D converter to generate a digital blade voltage signal in some embodiments. The processor 30 receives the digitized signal and performs various digital signal processing operations and/or computes derivative parameters based on the received signal. The processor 30 analyzes or otherwise performs operations on the conditioned blade signal to detect conditions indicative of contact between the first object and the blade 22.

Existing detection systems, such as the system 90 of FIG. 1, are configured for use when the power tool is operating to move an implement. For example, in the saw 1, the detection system 90 identifies contact between the moving saw blade and an object based on a transient signal, such as a spike in the digital blade voltage signal. The transient signal occurs over a short time, but system 90 recognizes the signal and the processor 30 takes appropriate actions within a brief time period of the contact between the blade and the object. When the saw blade is not moving, however, the transient signal still occurs if the signal is being passed through the blade, but the signal quickly returns to a similar level from before the contact occurred, and the detection system 90 cannot effectively identify long-term contact between the object and the implement. Additionally, if the object is already in contact with the static implement when the oscillator 10 begins generating the signal, then the detection system 90 does not detect the transient signal corresponding to initial contact between the object and the implement. For example, if an operator holds the saw blade 22 while the saw blade 22 is not moving, the sensing system 90 cannot identify the prolonged contact between the hand of the operator and the static blade 22. Consequently, improvements to power tools that enable identification of contact between an object and a non-moving implement in the power tool would be beneficial.

SUMMARY

In one embodiment, a method for identifying contact between a non-moving implement in a power tool and a human has been developed. The method includes sampling an electrical signal passing through the non-moving implement to obtain a series of samples of the electrical signal, identifying a component for each sample in the series of samples of the electrical signal, identifying a first max–min value corresponding to a first plurality of samples in the series of samples occurring during a first periodic time interval with reference to a difference between a maximum value and a minimum value identified in the components of the first plurality of samples, and identifying human contact with the non-moving implement in response to the first max–min value being greater than a first predetermined threshold.

In another embodiment, a power tool that is configured to detect contact between a human and a non-moving implement in the power tool has been developed. The power tool includes an actuator configured to move an implement, a clock source configured to generate a time varying electrical signal that passes through the implement, a memory, and a controller operatively connected to the actuator and the memory. The controller is configured to receive a series of samples of the electrical signal when the actuator is deactivated and the implement is a non-moving implement, identify a component for each sample in the series of samples of the electrical signal, identify a first max–min value corresponding to a first plurality of samples in the series of samples occurring during a first periodic time interval with reference to a difference between a maximum value and a minimum value identified in the components of the first plurality of samples, and identify human contact with the non-moving implement in response to the first max–min value being greater than a first predetermined threshold stored in the memory, and disable the actuator in response to identifying the human contact with the non-moving implement.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter saws, table saws, circular saws, reciprocating saws, jig saws, band saws, cold saws, cutters, impact drives, angler grinders, drills, jointers, nail drivers, sanders, trimmers, and routers. As used herein, the term "implement" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, a sensing circuit integrated with a power tool is used to halt the movement of the implement to avoid contact between a human operator and the implement while the implement is moving. As used herein, the term "static implement" refers to an implement in a power tool that is not moving. For example, a saw blade that is not moving when a saw is deactivated or a drill bit that is not rotating when a drill is deactivated are static implements.

Figure 5:
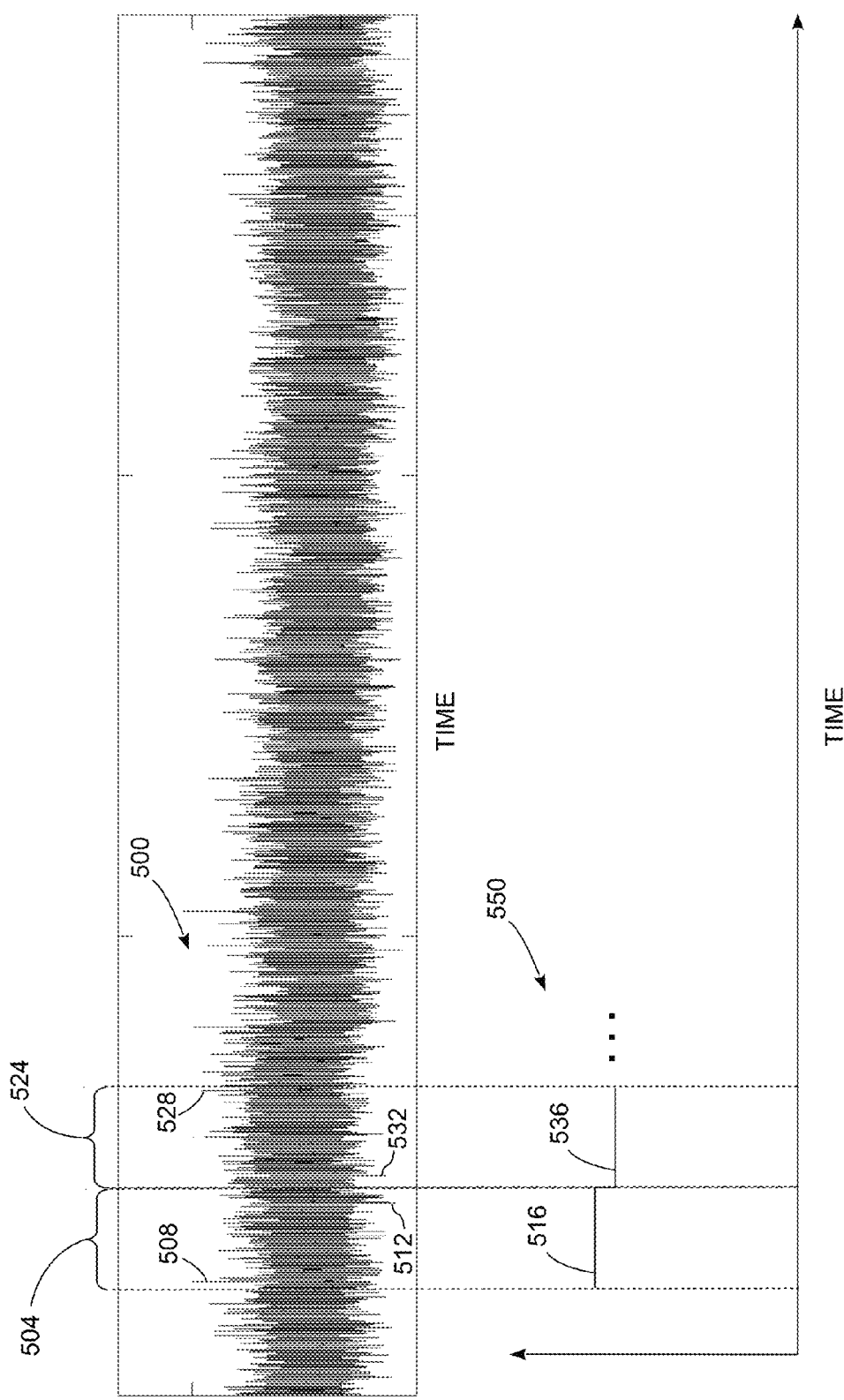
FIG. 5 is a graph depicting in-phase components of a signal that passes through a non-moving implement in a power tool and a corresponding graph of max–min values for time period intervals in the signal.

As used herein, the term "max–min" is an abbreviation for "maximum–minimum" and refers to an identified difference between a maximum value and minimum value of a signal identified in a plurality of samples of the signal obtained during a time period. For example, FIG. 5 depicts a graph of in-phase signal amplitude values 500 in series over time for a time-varying electrical signal that passes through a static implement in a power tool. Each of the vertical lines depicted in FIG. 5 represents a single sample generated from the signal with some amplitude values having positive or negative values due to changes in the amplitude of the signal. As used herein, the term "series" or "series of samples" refers to a plurality of samples identified in the signal over time with the samples being ordered based on the time at which each sample is obtained from the signal. For example, the periodic time intervals 512 and 524 in FIG. 5 each include a series of samples that are obtained at a predetermined sampling rate over time. During a first periodic time interval 504, the sample 508 has the maximum value for the samples obtained during interval 504 and the sample 512 has the minimum value for the same samples. Thus, the max–min value for the periodic time interval 504 is the difference between the values of samples 508 and 512, which is represented by the line 516 in a max–min plot 550. Similarly, in the periodic time interval 524, the sample 528 has the maximum value for the samples obtained in the interval 524 and the sample 532 has the minimum value for the same samples, and the max–min graph 550 depicts the difference 536 between the samples. Each max–min value in the graph 550 is greater than or equal to zero, with a max–min value of zero indicating that each of the samples in the graph 500 has the same value during the predetermined time period. As described in more detail below, the max–min values of an electrical signal that passes through an implement in a power tool change when the implement contacts an object, such as a portion of the human body.

Figure 1:
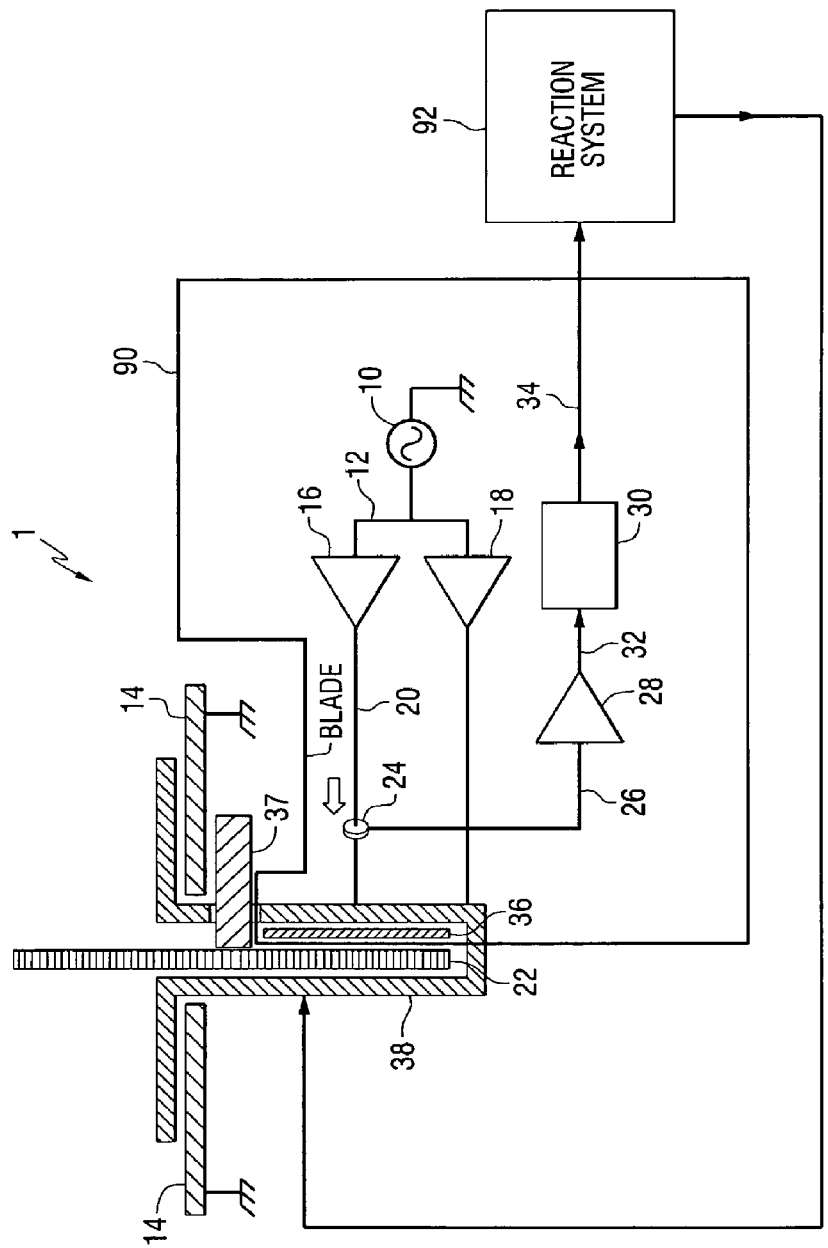
FIG. 1 is a diagram of a prior art table saw including a prior art detection system for detecting contact between a human and a saw blade.
Figure 2:
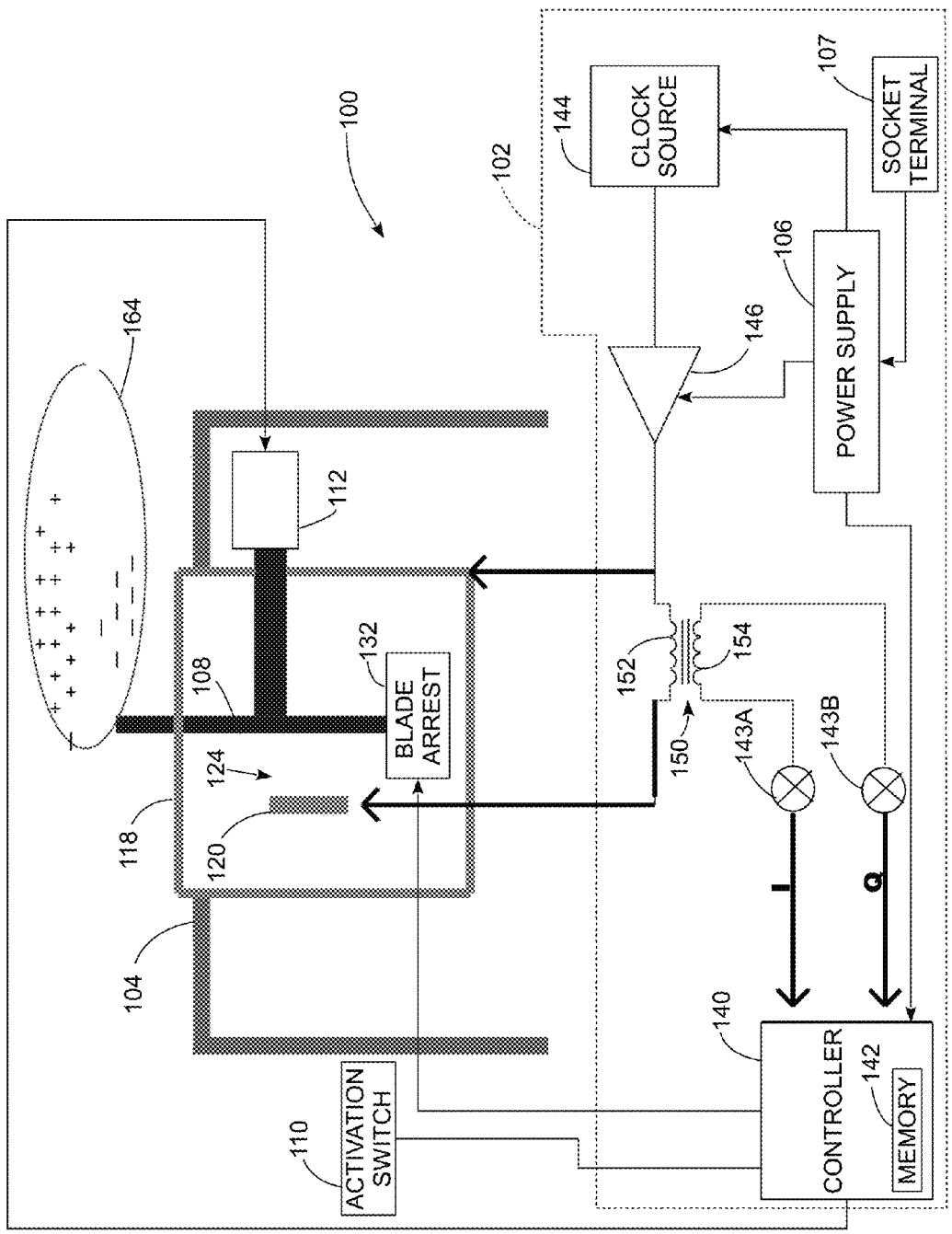
FIG. 2 is a block diagram of a table saw that is configured to identify if a saw blade in the saw is in contact with an object prior to rotating the saw blade.

FIG. 2 depicts a table saw 100. The table saw 100 includes a table 104 through which a saw blade 108 extends for cutting work pieces, such as pieces of wood. The table saw 100 also includes an electric motor 112, a blade enclosure 118, and a blade arrest device 132. A plate 120 and the blade 108 form a capacitor 124 where a small air gap between the plate 120 and the blade 108 acts as a dielectric. In different embodiments, the plate 120 is or includes a capacitive, resistive, projective capacitive, optical, thermal, near infra-red or other suitable sensing mechanism that either senses contact between the blade and an object or detects an object that approaches the blade 108. The blade enclosure 118 is electrically connected to the saw blade 108. The general configuration of the table 104, blade 108, and motor 112 are well known to the art for use in cutting work pieces and are not described in greater detail herein. Some components that are commonly used in table saws, such as guides for work pieces, blade height adjustment mechanisms, and blade guards are omitted from FIG. 2 for clarity.

The saw 100 includes a printed circuit card 102 to which a sensing circuit, which includes a clock source 144, driver amplifier 146, transformer 150 and a controller 140, are mounted. An electrical terminal socket 107, which is mounted on the printed circuit card 102 in FIG. 2 or otherwise electrically connected to the switched power supply 106 in another embodiment, receives an alternating current (AC) electrical power signal from an external power source, such as a generator or electrical utility provider. The switched power supply 106 converts the AC power signal from the external power source to a direct current (DC) electrical power signal at one or more voltage levels to supply power to the controller 140, clock source 144, and amplifier 146. The printed circuit card 102 and the components mounted on the printed circuit card 102 are electrically isolated from an earth ground. The power supply 106 serves as a local ground for the components mounted to the printed circuit card 102.

In the saw 100, the clock source 144 and driving amplifier 146 in the sensing circuit generate a time varying electrical signal that is directed through a primary winding 152 in the transformer 150, the plate 120, the blade 108, and the blade enclosure 118. The time varying electrical signal is referred to as a "sensing current" because the controller 140 senses contact between the blade 108 and a portion of a human body with reference to changes in the magnitude of the sensing current. The time varying electrical signal is a complex valued signal that includes both an in-phase component and quadrature component. The sensing current passes through the primary winding 152 in the transformer 150 to the plate 120. The changes in the primary winding caused by discharges between the plate 120 and the blade 108 produce an excitation signal in the secondary winding 154 of the transformer 150. The excitation signal is another complex valued signal that corresponds to the sensing current passing through the primary winding 152.

The controller 140 in the sensing circuit is operatively connected to the motor 112, the secondary winding 154 in the transformer 150, a mechanical blade arresting device 132. The controller 140 includes one or more digital logic devices including general purpose central processing units (CPUs), microcontrollers, digital signal processors (DSPs), analog to digital converters (ADCs), field programmable gate arrays (FPGAs), application specific integrated circuits (ASICs) and any other digital logic devices that are suitable for operation of the saw 100. The controller 140 includes a memory 142 that stores programmed instructions for the operation of the controller 140, and data corresponding to a threshold level of max–min variations that are generated in the sensing current when the static saw blade 108 is in contact with a human body.

During operation of the sensing circuit, the clock source 144 generates a time varying signal, such as sinusoidal waveform, at a predetermined frequency. In the embodiment of FIG. 2, the clock source 144 is configured to generate a signal at a frequency of 1.22 MHz, which is known to propagate through the human body. The amplifier 146 generates the sensing current as an amplified version of the signal from the clock source 144 with sufficient amplitude to drive the transformer 150 and capacitor 124 for detection by the controller 140.

During operation of the sensing circuit, the controller 140 receives the in-phase component I of the excitation signal in the secondary winding 154 through a first demodulator 143A and the quadrature component Q of the excitation signal through a second demodulator 143B. The transformer 150 isolates the sensing current flowing through the primary winding 152, plate 120, saw blade 108, and blade enclosure 118 from demodulators 143A and 143B that supply the in-phase and quadrature phase components of the signal, respectively, to the controller 140. Since the demodulators 143A and 143B generate electrical noise, the transformer 150 reduces or eliminates the effects of the noise on the primary winding 152 and sensing current. In one configuration, the transformer 150 is a 1:1 transformer where the primary winding 152 and secondary winding 154 have an equal number of turns. In alternative configurations, the ratio of windings in the primary winding 152 and secondary winding 154 are selected to either step-up or step-down the signal for demodulation and monitoring by the controller 140. The controller 140 includes one or more ADCs, filters, and other signal processing devices required to generate digital representations of the magnitude of the in-phase signal I and quadrature signal Q. The controller 140 identifies a magnitude of the sensing current A at a given time as a Pythagorean sum of the in-phase and quadrature components in each sample, as illustrated in the following equation: $A=\sqrt{I^2+Q^2}$. The controller 140 measures the demodulated signal at a predetermined frequency, such as a 100 KHz sampling rate, to identify changes in the magnitude A of the complex valued signal.

As the motor 112 rotates the blade 108, the rotating blade 108 comes into contact with different objects, including blocks of wood and other work pieces. A small portion of the charge that accumulates on the blade 108 flows into the work piece. The electrical conductivity of the wood work piece is, however, quite low, and the controller 140 in the sensing circuit continues to enable the motor 112 to rotate the saw blade 108. For example, when the blade 108 engages a block of wood, the controller 140 typically measures a small change in the sensing current A, but the change in the sensing current is identified as corresponding to wood or another material with low electrical conductivity.

While work pieces, such as wood, have low electrical conductivity, another object, such as a part of the human body, has a much higher electrical conductivity and absorbs a much greater portion of the charge on the blade 108 as the part approaches the blade 108. In FIG. 2 a portion of a human body 164, such as a hand, finger, or arm, is represented by a charge cloud indicating the flow of charge from the blade 108 to the human body. The controller 140 identifies imminent contact between the human body 164 and the blade 108 as a rapid change in the magnitude A of the sensing current at the time when the human body 164 nears the blade 108. In response to the rapid change in the magnitude of the sensing signal, the controller 140 deactivates the motor 112, engages the blade arrest device 132 to halt the motion of the blade 108, and optionally retracts the blade 108 before the blade contacts the human body 164.

In the configuration of FIG. 2, the saw blade 108 is a circular saw blade with a plurality of teeth arranged around the circumference of the blade. The teeth engage work pieces to cut the work pieces during normal operation of the saw. The teeth in the blade 108 also accumulate electrical charge from the sensing current. The teeth on the saw blade facilitate discharge of the electrical charge accumulated on the saw blade 108 to the human body 164 as the human body approaches the saw blade 108. In some configurations, an electrical arc between the human body 164 and the tips of the teeth in the saw blade 108 enables the charge accumulated on the blade 108 to flow into the human 164 prior to the human 164 actually contacting the blade 108. The arc distance is typically on the order of a few millimeters. The controller 140 identifies the change in the magnitude A of the sensing current and halts the blade 108 in response to discharge from the blade 108 due either to direct contact or close proximity between the human 164 and the blade 108.

In the configuration of FIG. 2, the human body has sufficient conductivity and capacity to draw charge from the blade 108 even when the printed circuit card 102 is isolated from earth ground and when the human body 164 is isolated from earth ground, such as when a human operator wears shoes with rubber soles. Thus, while the printed circuit card 102 and the human 164 do not share a common electrical ground, the controller 140 continues to identify contact between the human 164 and the blade 108 through identification of a rapid change in the identified sensing current amplitude A. While the absolute value of the amplitude A may vary during operation of the saw 100, the controller 140 can still identify contact with the human 164 in response to the magnitude and time of the change in the relative value of the amplitude A. During operation of the saw 100, the controller 140 is configured to identify contact with the human 164 and to deactivate the motor 112 and engage the blade arrest mechanism 132 to halt the saw blade 108 in a time period of approximately 1 millisecond.

In the saw 100, the controller 140 deactivates the electrical motor 112 in response to identification of contact between the blade 108 and a portion of a human. In the saw 100, the saw blade 108 generally continues rotating for a period of several seconds due to the momentum that the saw blade 108 accumulates during operation. The blade arrest device 132 is configured to either halt the saw blade 108 in a much shorter period of time, to drop the saw blade 108 below the table 104 to retract the saw blade 108 from contact with the human, or to both halt and retract the blade 108. In the saw 100, the blade arrest 132 includes a brake mechanism that halts the rotation of the blade 108. Additionally, the blade arrest 132 withdraws the blade 108 below the surface of the table 104. In other power tool embodiments, the moving implement halts in a short period of time after deactivation of an actuator without the requirement for an additional brake mechanism.

In addition to sensing contact between an object and the saw blade 108 when the saw blade 108 is moving, the sensing circuit in the saw 100 is configured to identify contact between the saw blade 108 and an object, such as a portion of the human body 164, when the saw blade 108 is static. In particular, the controller 140 is configured to identify if an object is in contact with the static saw blade 108 when an operator closes an activation switch 110 to begin using the saw 100. As described in more detail below, the controller 140 activates the sensing current through the blade 108 to identify if an object, such as the human 164, is in contact with the blade 108 prior to the operation of the activation switch 110. The controller 140 identifies contact with reference to the variations in maximum and minimum sampled values for the in-phase component identified for multiple samples of the sensing current and a predetermined in-phase max–min threshold value that is stored in the memory 142. In an alternative embodiment, the controller 140 identifies contact between the human 164 and the saw blade 22 using either the quadrature phase component of the sensing current, or using a combination of the in-phase and quadrature phase components of the sensing current.

The controller 140 only activates the electric motor 112 to rotate the blade 108 if the blade 108 is not in contact with the human 164 or an object other than a work piece, such as a piece of wood. If the controller 140 identifies that the blade 108 is in contact with the human 164, then the controller 140 locks out the motor 112. To lock out the motor 112, the controller 140 disables operation of the motor 112 and does not reactivate the motor 112 until an appropriate manual action is taken to ensure that objects are removed from proximity with the saw blade 108. The controller 140 optionally generates an alarm, such as an audible or visual indicator, indicating that the electric motor 112 is locked out and that the operator should take an appropriate action to re-enable the saw 100.

FIG. 2 depicts a table saw as an illustrative example of a power tool that is configured to identify contact between a portion of a human body or other object and a static implement, which is the saw blade 108 when the saw blade 108 is not moving in the saw 100. Alternative embodiments are envisioned that incorporate the sensing circuit of FIG. 2 into a wide range of power tools including, but not limited to, handheld electric drills, drill presses, handheld circular saws, reciprocating saws, band saws, routers, grinders, and any other power tool with static implements that contact objects when the power tool is deactivated.

Figure 3:
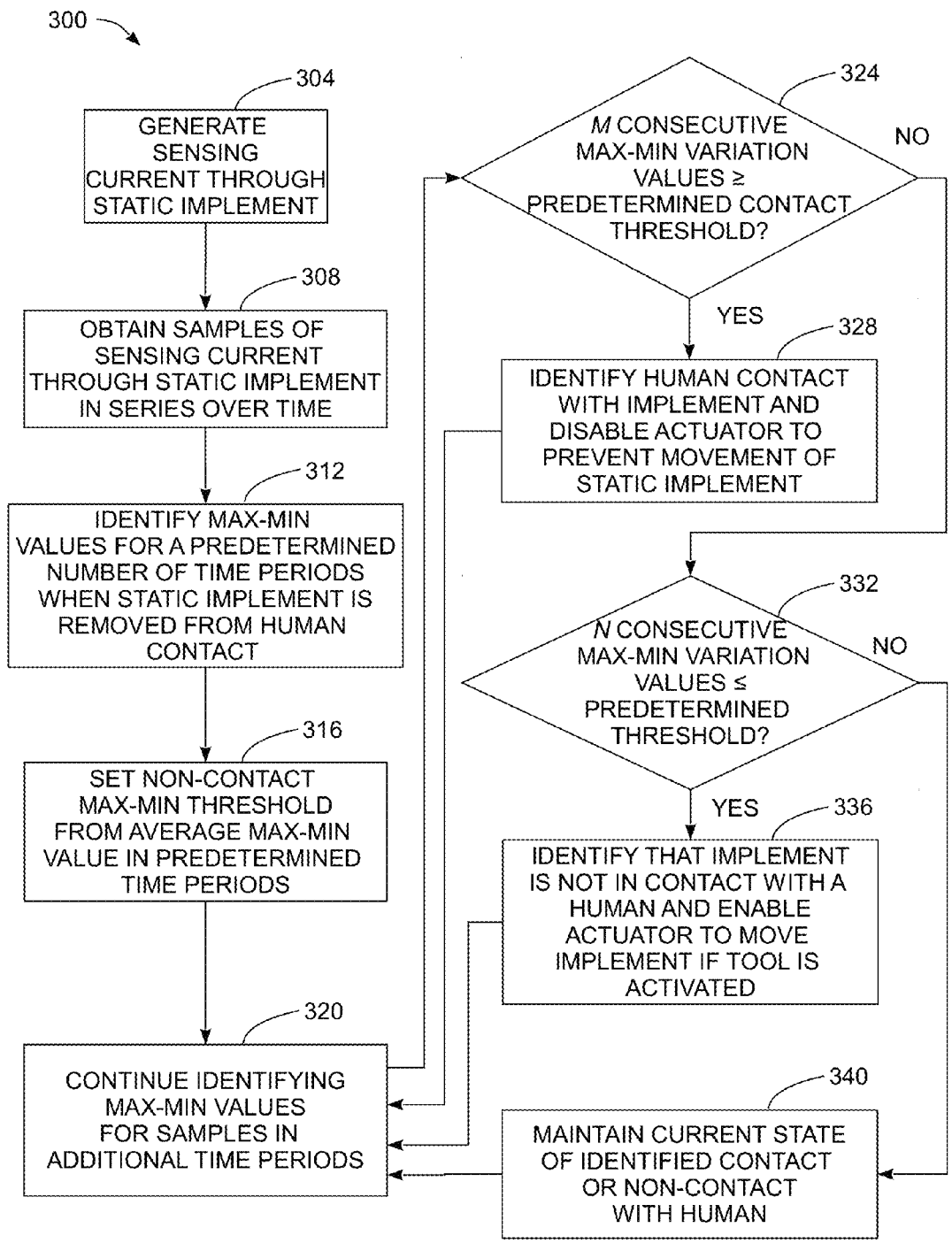
FIG. 3 is a flow diagram of a process for identifying contact or non-contact between a human and a non-moving implement in a power tool.

FIG. 3 depicts a process 300 for identifying if an object, such as a portion of a human body, contacts a static implement in a power tool. FIG. 3 is described in conjunction with the saw 100 of FIG. 2 for illustrative purposes. In the discussion below, a reference to the process 300 performing a function or action refers to one or more processors, such as the controller 140, executing programmed instructions stored in a memory to operate components of the power tool to perform the function or action.

Process 300 begins as the power tool generates the electrical signal for the sensing current through that is passed through the implement (block 304). As described above with reference to FIG. 2, the amplified time varying electrical signal from the clock source 144 and amplifier 146 passes through the transformer 150 and the capacitor 124 formed from the plate 120 and the saw blade 108.

During process 300, the controller 140 obtains a series of samples of the sensing current through the static implement (block 308). In the saw 100, the controller 140 receives the series samples of the in-phase component I of the sensing current that is passed through the secondary winding 154 in the transformer 150. The sensing current passing through the primary winding 152 generates a corresponding excitation current in the secondary winding 154, and the demodulator 143A provides the in-phase component I of the sensing current to the controller 140. The process 300 does not require the controller 140 to obtain samples of the quadrature phase component Q from the demodulator 143B, although the controller 140 is configurable to sample the quadrature phase component Q for use in alternative embodiments. For example, in alternative embodiments, the controller 140 obtains samples of both the in-phase and quadrature phase components to identify human contact with the saw blade 122 independently. The processor 140 identifies human contact with the saw blade 122 using both the in-phase and quadrature phase signals.

The controller 140 includes any additional circuitry, such as filters and ADCs, to generate digital data corresponding to the in-phase component of the sensing current. The controller 140 samples the received in-phase component of the sensing current over time at a predetermined sampling rate such as, for example, a 100 KHz sampling rate, to obtain the series of samples for the sensing current.

Process 300 continues as the power tool identifies a max–min value for samples over each time interval in a predetermined number of periodic time intervals when the implement is removed from contact with external objects, such as a portion of a human body (block 312). In one embodiment of the process 300, the controller 140 generates a single max–min value for samples that are generated during a series of forty millisecond time intervals. The controller 140 identifies ten max–min values for the sampled signal values over a period of four hundred milliseconds (ten periodic time intervals of forty milliseconds) when the implement is not in contact with an external object such as, for example, a time period shortly after the power tool is connected to a battery, electrical outlet, or other source of electrical power. While process 300 is described using forty millisecond time intervals and a series of ten max–min values, alternative embodiments use shorter or longer time intervals and a different number of consecutive time intervals to identify an expected range of max–min values when an implement is not in contact with objects.

After generating the predetermined number of max–min values from the signal samples when the implement is removed from contact with a human, process 300 identifies a max–min value threshold corresponding to the average of the identified max–min values (block 316). The identified max–min threshold corresponds to an expected variation between the maximum and minimum sample values for the in-phase component of the sensing current signal when the saw blade 108 is removed from contact with a human body. The threshold is also referred to as a non-contact threshold. In the saw 100, the controller 140 stores the identified max–min values for the non-contact threshold in the memory 142.

Figure 4:
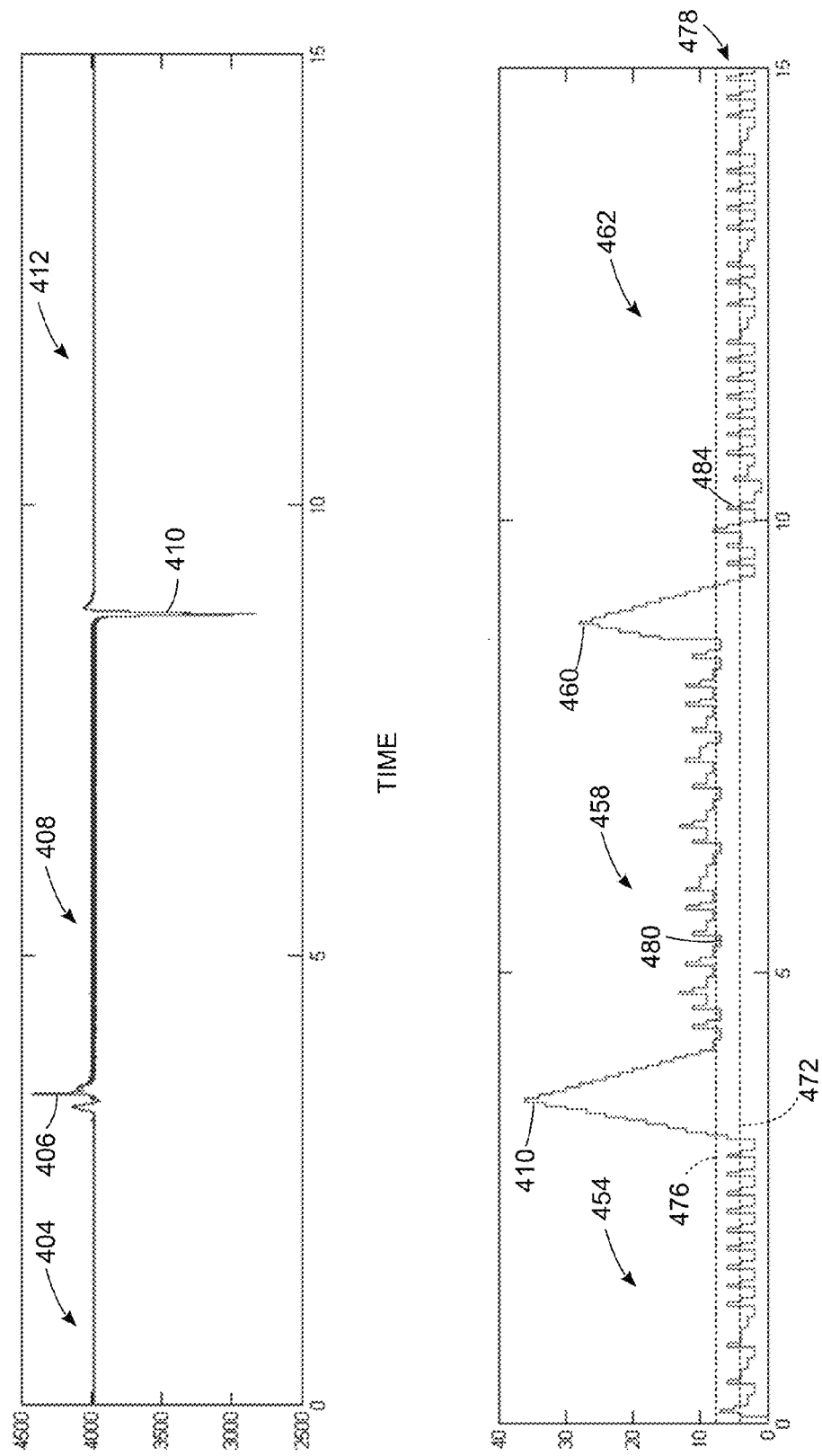
FIG. 4 is a graph depicting in-phase components of a signal that passes through a non-moving implement in a power tool and max–min values corresponding to the signal during periods of human contact and human non-contact with the non-moving implement.

FIG. 4 depicts exemplary graphs including a signal graph with a series of samples 404 of the in-phase component of the sensing current that are obtained when the saw blade 108 is removed from contact with external objects and corresponding max–min value 454 that are generated from the sample values 404. During the processing described above with reference to the blocks 312 and 316, the controller 140 identifies the non-contact threshold 472 as the average value of a predetermined number of the max–min values 454. As described below, the non-contact threshold is used to identify if the implement has been removed from contact with the body of a human after the human comes into contact with the implement.

Referring again to FIG. 3, process 300 continues to obtain a series of samples of the in-phase component of the sensing current and to identify max–min values for additional time periods (block 320). For example, the controller 140 continues to sample the sensing current and identify max–min values from the samples over successive forty millisecond time periods.

While process 300 identifies the max–min sample values, a human operator or other person may come into contact with the static implement. For example, in the saw 100 a human operator may touch the saw blade 108 while the saw blade 108 is not moving. The contact between the human and the saw blade generates a greater degree of variability in the sensing current, and the corresponding max–min values for samples generated from the sensing current increase when the human is in contact with the saw blade 108. For example, in FIG. 4 the spike 406 corresponds to a transient in the sensing signal that is generated when the human first contacts the saw blade 108, and the series of samples 408 correspond to the steady-state sensing signal as the human remains in contact with the saw blade 108. The max–min values similarly include a peak 410 that corresponds to the transient spike 406, and steady state max–min values 458. In FIG. 4, the average value of the max–min values 458 exceeds a predetermined max–min value 476 corresponding to a contact threshold. The contact threshold 476 is identified empirically and stored in a memory, such as the memory 142, of the power tool prior to commencing the process 300. The contact threshold 476 is greater than the non-contact threshold 472.

During process 300, the identification of human contact with the static implement in the power tool is made with reference to the max–min value for series of samples taken over a predetermined number of periods compared to both the contact threshold 476 and non-contact threshold 472. For example, while the peak 410 in the max–min graph indicates initial contact with the implement in the power tool, the peak 410 quickly drops and is not a reliable indicator of prolonged contact between a human and the implement. Additionally, when the human releases the implement, as indicated by the signal data spike 410 in FIG. 4, a second max–min peak 460 is generated. Since both the initial contact and initial release of the implement generate peaks 410 and 460, respectively, in the max–min data, process 300 instead identifies contact or non-contact between the implement and a human body with reference to the identified max–min values that are identified over multiple sample periods compared to the non-contact threshold 472 and contact threshold 476.

Referring again to FIG. 3, if M consecutive identified max–min values exceed the predetermined contact threshold (block 324), then the power tool identifies human contact with the implement and disables the actuator to prevent movement of the implement (block 328). The number M is a predetermined number of consecutive max–min values that are above the contact threshold. For example, in the saw 100 the controller 140 identifies that the saw blade 108 is in contact with a human if three consecutive max–min values are above the contact threshold 476. Different embodiments of the process 300 include a different number for the M consecutive max–min values that are above the threshold 476, and the value of M is one in some embodiments.

In FIG. 4, the max–min samples in both peaks 410 and 460, as well as the average of the max–min values in the region 458 are above the contact threshold 476, and the controller 140 identifies that a human is in contact with the saw blade 108 during the corresponding time span. Note that even though the peak 460 corresponds to the removal of contact between the human and the saw blade 108, the increased max–min values still exceed the contact threshold 476 and the controller 140 continues to identify contact between the human and the saw blade 108 during the removal process. While the controller 140 identifies that the human is in contact with the saw blade 108, the controller 140 disables the motor 112 so that an attempt to operate the saw 100 using the switch 110 does not result in activation of the motor 112.

Referring again to FIG. 3, if N consecutive identified max–min values are less than or equal to the non-contact threshold value (block 332), then the power tool identifies that the implement is not in contact with the human and enables the actuator for operation of the power tool (block 336). The number N is a predetermined number of consecutive max–min values that are above the contact threshold. For example, in the saw 100 the controller 140 identifies that the saw blade 108 is not in contact with a human if three consecutive max–min values are below the non-contact threshold 472. In another embodiment, the predetermined number N is greater than the predetermined number M to increase the number of consecutive identified max–min values that are below the non-contact threshold 472 to identify that the implement is not in contact with a human body. In FIG. 4, the controller 140 identifies that the human is not in contact with the implement in the regions 454 and 462 of the max–min data that are generated from the series of samples 404 and 412, respectively.

During process 300, one or more max–min values in a series neither exceed the contact threshold 476, nor fall at or below the non-contact threshold 472. For example, in FIG. 4 the max–min values 480 and 484 are both below the contact threshold 476 and above the non-contact threshold 472 in an intermediate region 478. In the saw 100, if the controller 140 identifies that at least one max–min value in the group of M consecutive samples is less than the contact threshold (block 324) and that at least one max–min value in the group of N consecutive samples is greater than the non-contact threshold (block 332), then the controller 140 maintains the current state of identification between the saw blade and a portion of a human body (block 340). For example, in FIG. 4 the max–min values 480 are identified in the time period 458 when the controller 140 identifies contact between the saw blade 108 and a human. The controller 140 continues to identify the contact during the time when the max–min values 480 are identified. Similarly, the max–min values 484 are identified in the time period 462 when the controller 140 identifies that the saw blade 108 is not in contact with a human, and the controller 140 continues to identify the non-contact during the time corresponding to the max–min values 484.

Process 300 continues in an iterative manner to sample the signal and identify contact and non-contact between the static implement in the power tool and the human over time. Process 300 ends when the power tool is in operation and the implement moves, and the power tool optionally performs a different process to identify contact between the implement and a portion of a human body while the implement is moving. Process 300 is subsequently restarted after the actuator in the power tool is deactivated to identify contact between the static implement and a human prior to reactivation of the actuator.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for detection of human contact with a non-moving implement in a power tool comprising:
    generating, with a clock source in the power tool, a time varying electrical signal that passes through the non-moving implement;
    sampling, with a controller in the power tool, the time varying electrical signal passing through the non-moving implement to obtain a series of samples of the electrical signal;
    identifying, with the controller, a component for each sample in the series of samples;
    identifying, with the controller, a first max–min value corresponding to a first plurality of samples in the series of samples occurring during a first periodic time interval with reference to a difference between a maximum value and a minimum value identified in the components of the first plurality of samples;
    identifying, with the controller, human contact with the non-moving implement in response to the first max–min value being greater than a first predetermined threshold; and
    disabling, with the controller, an actuator in the power tool that is configured to move the non-moving implement in response to identifying the human contact with the non-moving implement.

2. The method of claim 1 further comprising:
    Identifying, with the controller, a second max–min value corresponding to a second plurality of samples in the series of samples occurring in a second periodic time interval after the first periodic time interval with reference to a difference between a maximum value and a minimum value identified in the components of the second plurality of samples; and identifying, with the controller, the human contact with the non-moving implement only in response to both the first max–min value and the second max–min value being greater than the first threshold.

3. The method of claim 1 further comprising:
sampling, with the controller, the time varying electrical signal during a time period of human non-contact with the non-moving implement to obtain another series of samples;
identifying, with the controller, a plurality of max–min values corresponding to a plurality of samples in the other series of samples occurring during each periodic time interval in a plurality of periodic time intervals with reference to a difference between a maximum value and a minimum value identified in the components of the plurality of samples in each of the plurality of time intervals;
identifying, with the controller, a second threshold as an average of the identified plurality of max–min values, the second threshold being less than the first threshold; and
storing, with the controller, the second threshold in a memory of the power tool for identification of human non-contact with the non-moving implement in another periodic time interval.

4. The method of claim 3 further comprising:
identifying, with the controller, a third max–min value corresponding to a third plurality of samples in the series of samples occurring during a third periodic time interval with reference to a difference between a maximum value and a minimum value identified in the components of the third plurality of samples; and
identifying, with the controller, human non-contact with the non-moving implement in response to the third max–min value being less than the second threshold.

5. The method of claim 4 further comprising:
identifying, with the controller, a fourth max–min value corresponding to a fourth plurality of samples in the series of samples occurring during a fourth periodic time interval after the third periodic time interval with reference to a difference between a maximum value and a minimum value identified in the components of the fourth plurality of samples; and
identifying, with the controller, the human non-contact only in response to both the third max–min value and the fourth max–min value being less than the second threshold.

6. The method of claim 1, wherein the identified component for each sample is an in-phase component.

7. The method of claim 1, wherein the identified component for each sample is a quadrature phase component.

8. A power tool comprising:
an actuator configured to move an implement;
a clock source configured to generate a time varying electrical signal that passes through the implement;
a memory; and
a controller operatively connected to the actuator and the memory, the controller being configured to:
obtain a series of samples of the time varying electrical signal when the actuator is deactivated and the implement is a non-moving implement;
identify a component for each sample in the series of samples;
identify a first max–min value corresponding to a first plurality of samples in the series of samples occurring during a first periodic time interval with reference to a difference between a maximum value and a minimum value identified in the in-phase components of the first plurality of samples; and
identify human contact with the non-moving implement in response to the first max–min value being greater than a first predetermined threshold stored in the memory; and
disable the actuator in response to identifying the human contact with the non-moving implement.

9. The power tool of claim 8, the controller being further configured to:
identify a second max–min value corresponding to a second plurality of Samples in the series of samples occurring in a second periodic time interval After the first periodic time interval with reference to a difference between a Maximum value and a minimum value identified in the components of the second Plurality of samples; and
identify human contact with the non-moving implement in response to the first max–min value and thee second max–min value being greater than the first threshold.

10. The power tool of claim 8, the controller being further configured to:
obtain another series of samples of the time varying electrical signal during a time period of human non-contact with the non-moving implement;
identify a plurality of max–min values corresponding to a plurality of samples in the other series of samples occurring during each periodic time interval of a plurality of periodic time intervals with reference to a difference between a maximum value and a minimum value identified in the components of the plurality of samples in each of the plurality of time intervals;
identify a second threshold as an average of the identified plurality of max–min values, the second threshold being less than the first threshold; and
store the second threshold in the memory for identification of human non-contact with the non-moving implement in another periodic time interval.

11. The power tool of claim 10, the controller being further configured to:
identify a third max–min value corresponding to a third plurality of samples in the series of samples occurring during a third periodic time interval with reference to a difference between a maximum value and a minimum value identified in the components of the third plurality of samples; and
identify human non-contact with the non-moving implement in response to the third max–min value being less than the second threshold stored in the memory.

12. The power tool of claim 11, the controller being further configured to:
identify a fourth max–min value corresponding to a fourth plurality of samples in the series of samples occurring during a fourth periodic time interval after the third periodic time interval with reference to a difference between a maximum value and a minimum value identified in the components of the fourth plurality of samples; and
identify the human non-contact with the non-moving implement only in response to both the third max–min value and the fourth max–min value being less than the second threshold stored in the memory.

13. The power tool of claim 11, the controller being further configured to:
enable operation of the actuator to move the implement in response to the identification of the human non-contact with the non-moving implement.

14. The power tool of claim 8, the controller being further configured to identify an in-phase component of each sample.

15. The power tool of claim 8, the controller being further configured to identify a quadrature phase component of each sample.

\* \* \* \* \*